(12) United States Patent
Mu

(10) Patent No.: US 11,963,162 B2
(45) Date of Patent: Apr. 16, 2024

(54) DATA TRANSMISSION METHOD AND DEVICE BASED ON UPLINK GRANT-FREE SCHEDULING, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 429 days.

(21) Appl. No.: 17/288,241

(22) PCT Filed: Oct. 29, 2018

(86) PCT No.: PCT/CN2018/112500
§ 371 (c)(1),
(2) Date: Apr. 23, 2021

(87) PCT Pub. No.: WO2020/087229
PCT Pub. Date: May 7, 2020

(65) Prior Publication Data
US 2021/0392665 A1 Dec. 16, 2021

(51) Int. Cl.
*H04W 72/1268* (2023.01)
*H04W 28/26* (2009.01)
(Continued)

(52) U.S. Cl.
CPC ....... *H04W 72/1268* (2013.01); *H04W 28/26* (2013.01); *H04W 72/0446* (2013.01);
(Continued)

(58) Field of Classification Search
CPC ............. H04W 72/1268; H04W 72/21; H04W 72/535; H04W 72/52; H04W 28/26; H04W 72/0446; H04W 72/0466
See application file for complete search history.

(56) References Cited

U.S. PATENT DOCUMENTS 11,057,898 B2 * 7/2021 Qian .................... H04W 72/23
2018/0288779 A1 10/2018 Dai et al.
(Continued)

FOREIGN PATENT DOCUMENTS

CN 106793091 A 5/2017
WO WO 2018084559 A1 5/2018

OTHER PUBLICATIONS

PCT/CN2018/112500 English translation of the International Search Report dated Jul. 10, 2019, 2 pages.
(Continued)

*Primary Examiner* — Chandrahas B Patel
(74) *Attorney, Agent, or Firm* — COZEN O'CONNOR

(57) ABSTRACT

A data transmission method and a data transmission device based on uplink grant-free scheduling, and a storage medium. The method includes: transmitting first uplink data to a base station based on pre-configured first uplink scheduling information; transmitting first indicating information of data to be transmitted to the base station, the first indicating information of data to be transmitted for indicating whether there is data to be transmitted in the terminal after transmitting the first uplink data; and transmitting second uplink data to the base station on a target resource based on second uplink scheduling information in response that there is the data to be transmitted in the terminal, the second uplink data being all or part of the data to be transmitted, and the target resource is a resource reserved by the base station for the terminal based on the second uplink scheduling information.

19 Claims, 7 Drawing Sheets

(51) Int. Cl.
*H04W 72/044* (2023.01)
*H04W 72/0446* (2023.01)
*H04W 72/21* (2023.01)
*H04W 72/50* (2023.01)
*H04W 72/52* (2023.01)

(52) U.S. Cl.
CPC ....... *H04W 72/0466* (2013.01); *H04W 72/21* (2023.01); *H04W 72/52* (2023.01); *H04W 72/535* (2023.01)

(56) References Cited

U.S. PATENT DOCUMENTS

2019/0045528 A1* 2/2019 Xu .................. H04W 72/23
2021/0127411 A1* 4/2021 Zhang ................ H04W 72/21

OTHER PUBLICATIONS

Indian Patent Application No. 202147020595 Office Action dated Feb. 28, 2022, 6 pages.
European Patent Application No. 18939114.7 extended Search and Opinion dated May 12, 2022, 10 pages.
Sierra Wireless "Pre-configured UL Resources Design Considerations" 3GPP Draft; R2-1815078; Chengdu, China; Oct. 8-12, 2018; 8 pages.

\* cited by examiner

DATA TRANSMISSION METHOD AND DEVICE BASED ON UPLINK GRANT-FREE SCHEDULING, AND STORAGE MEDIUM

CROSS-REFERENCE TO RELATED APPLICATION

This application is a U.S. national phase of International Application No. PCT/CN2018/112500 filed on Oct. 29, 2018, the entire content of which is incorporated herein by reference.

TECHNICAL FIELD

The disclosure relates to the field of wireless communication technologies, and in particular to a data transmission method and a data transmission apparatus based on uplink grant-free scheduling, and a storage medium.

BACKGROUND

Internet of Things (IoT) devices in a scene of Internet of Things usually have requirements for uplink grant-free scheduling because a volume of data transmitted in each uplink is relatively small.

In related arts, under the uplink grant-free scheduling, a base station may pre-configure some scheduling information employed in uplink transmission for a terminal, such as resource allocation, transmission mode, and modulation and demodulation mode. When the terminal wakes up, it does not need to perform random access and receive uplink scheduling permission. In other words, uplink transmission may be automatically performed on a pre-configured resource, thereby achieving the purpose of reducing signaling overhead and avoiding power waste. However, in related arts, there is no resource and data transmission method that satisfies terminal communication requirement and can also be performed efficiently.

SUMMARY

According to a first aspect of embodiments of the disclosure, there is provided a data transmission method based on uplink grant-free scheduling, including: transmitting, by a terminal, first uplink data to a base station based on pre-configured first uplink scheduling information; transmitting, by the terminal, first indicating information of data to be transmitted to the base station, the indicating information of data to be transmitted for indicating whether there is data to be transmitted in the terminal after transmitting the first uplink data; receiving, by the base station, the first uplink data and the first indicating information of data to be transmitted based on the first uplink scheduling information; reserving, by the base station, a target resource for the terminal based on second uplink scheduling information in response that there is the data to be transmitted in the terminal; transmitting, by the terminal, second uplink data to the base station on the target resource based on the second uplink scheduling information, the second uplink data being all or part of the data to be transmitted; and receiving, by the base station, the second uplink data on the target resource based on the second uplink scheduling information.

According to a second aspect of embodiments of the disclosure, there is provided a data transmission method based on uplink grant-free scheduling, implementable by a terminal, and including: transmitting first uplink data to a base station based on pre-configured first uplink scheduling information; transmitting first indicating information of data to be transmitted to the base station, the first indicating information of data to be transmitted for indicating whether there is data to be transmitted in the terminal after transmitting the first uplink data; and transmitting second uplink data to the base station on a target resource based on second uplink scheduling information in response that there is the data to be transmitted in the terminal, the second uplink data being all or part of the data to be transmitted, and the target resource is a resource reserved by the base station for the terminal based on the second uplink scheduling information.

According to a third aspect of embodiments of the disclosure, there is provided a data transmission method based on uplink grant-free scheduling, implementable by a base station, and including: receiving first uplink data transmitted by a terminal based on pre-configured first uplink scheduling information; acquiring first indicating information of data to be transmitted from the terminal, the first indicating information of data to be transmitted for indicating whether there is data to be transmitted in the terminal after transmitting the first uplink data; reserving a target resource for the terminal based on second uplink scheduling information in response to the first indicating information of data to be transmitted indicating that there is the data to be transmitted in the terminal; and receiving, on the target resource, second uplink data transmitted by the terminal based on the second uplink scheduling information, the second uplink data being all or part of the data to be transmitted.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
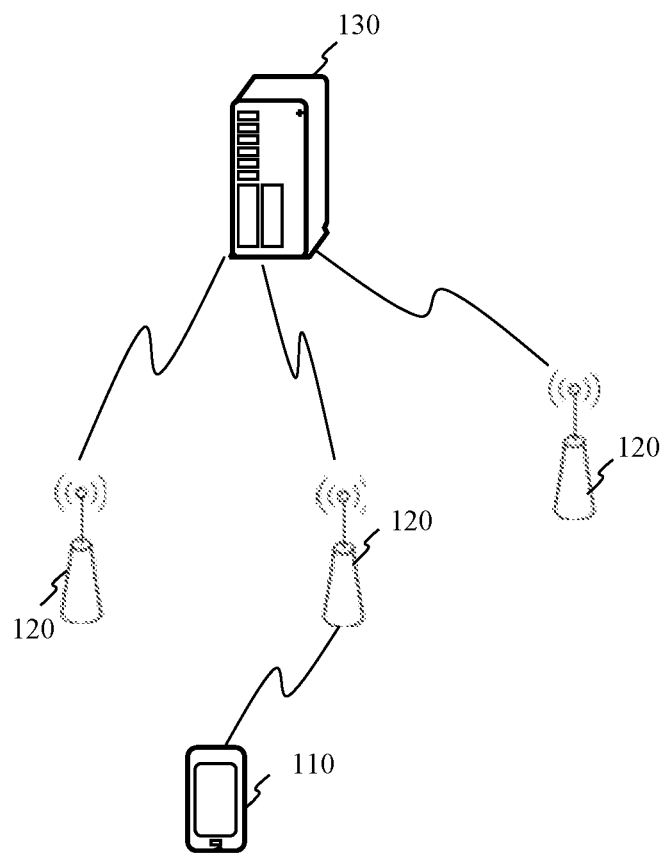
FIG. 1 is a schematic structural diagram illustrating a wireless communication system, according to some exemplary embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that "several" mentioned in the disclosure may refer to one or more, and "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

In recent years, with the rapid development of Internet of Things (IoT) technologies, Internet of Things devices have brought a lot of convenience to people's lives and work. Machine-type communication (MTC) and narrow band Internet of Things (NB-IoT) are typical representatives of cellular Internet of Things technologies. At present, such technologies have been widely used in smart cities (such as reading meter), smart agriculture (for example collecting information such as temperature and humidity), smart transportation (such as shared bicycles), and many other fields.

Since most of terminals in MTC and NB-IoT are deployed in areas where wireless signal propagation is limited such as basements, and hardware capabilities of terminals are limited, their coverage capabilities are not as good as conventional Long Term Evolution (LTE) networks. Therefore, repeated transmission is usually used in MTC and NB-IoT networks to accumulate power, thereby achieving an effect of coverage enhancement. Simply, the repeated transmission means that the same transmission content is transmitted in multiple time units. This time unit may be one subframe or multiple subframes.

In addition, since most of terminals in MTC and NB-IoT are deployed in scenarios that are not easy to charge or replace batteries, such as in the open country or in the basement, the power saving for terminals in MTC and NB-IoT is a major feature of MTC and NB-IoT.

In the scene of IoT, the volume of data transmitted each time is relatively small. If the conventional LTE data transmission process is followed, that is, when every time the data is transmitted, random access with the base station is performed, uplink scheduling permission is received, and data upload process is performed, it may bring huge signaling overhead, and resources occupied by signaling transmission may be far greater than resources occupied by data transmission. Therefore, for this scenario, uplink grant-free scheduling may be introduced into MTC and NB-IoT scenarios in the related art. That is, the base station may pre-configure some scheduling information used by the terminal for uplink transmission, such as resource allocation, modulation and coding mode, multi-antenna transmission mode, and transmission power. After the terminal wakes up, it does not need to perform random access and receive uplink scheduling permission, that is, it may automatically perform uplink transmission on a pre-configured resource in a preset mode, thereby achieving the purpose of reducing signaling overhead and avoiding power waste.

As mentioned above, in the uplink grant-free scheduling in the related art, the base station may pre-configure transmission resources and transmission modes for the terminal in advance (for example, the transmission modes may include modulation and coding modes, multi-antenna transmission modes, and transmission powers). When there is data to be transmitted for the user, it may be transmitted directly on the pre-configured resource based on the preset transmission mode.

In the uplink grant-free scheduling in the related art, the base station may configure a periodic resource for the terminal. The configured resource may include a size of the resource, a time-frequency location of the resource, a period in which the resource occurs, a modulation and coding mode used on this physical resource, and the like. In addition, in order to serve certain terminals with poor channel conditions, the base station may additionally configure the number of repeated data transmissions. Due to changes in the size of the data to be transmitted in the terminal and channel conditions where the terminal is located, supporting a single physical resource configuration is likely to cause a situation that the data to be transmitted may not transmitted at one time, that is, the single physical resource configuration may carry a data block of one size type. When the size of the data to be transmitted exceeds a size supported by the data block, the data to be transmitted needs to be divided into multiple transmissions. For this situation, the solution in the related art may be to transmit the uncompleted data in the next resource period. However, this method may bring a relatively large delay and may not provide a better user experience. Another solution may be to configure resource configurations that support multiple sizes of data blocks. The terminal may select different resource configurations based on the sizes of data to be transmitted. Because data blocks of different sizes do not always exist, this processing method may have some configured physical resources that are not being used, resulting in a waste of resources.

With the solutions provided in embodiments of the disclosure, in the uplink grant-free scheduling, a resource and data transmission method that may not only satisfy terminal communication requirements but also improve the efficiency in the uplink grant-free scheduling may be provided.

A data transmission solution based on uplink grant-free scheduling, provided in embodiments of the disclosure, may be applicable to a wireless communication system, such that a terminal transmitting uplink data to a base station may be implemented.

FIG. 1 is a schematic structural diagram illustrating a wireless communication system, according to some exemplary embodiments. As illustrated in FIG. 1, the mobile communication system may include: several terminals 110 and several base stations 120.

The terminal 110 may be a device that provides speech and/or data connectivity for the user. The terminal 110 may communicate with one or more core networks via a radio access network (RAN). The terminal 110 may be an Internet of Things terminal, such as a sensor device, a mobile phone (or a "cellular" phone), and a computer having an Internet of Things terminal, for example, a fixed, portable, pocket-sized, handheld, computer built-in, or vehicle-mounted device. For example, it may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle.

The base station 120 may be a network side device in the wireless communication system. The wireless communication system may be the 4$^{th}$ generation mobile communication (4G) system, also known as the Long Term Evolution (LTE) system; or, the wireless communication system may be the 5$^{th}$ generation mobile communication (5G) system, also known as the new radio (NR) system. Alternatively, the wireless communication system may be the next generation system following the 5G system.

The base station 120 may be an evolved node base station (eNB) used in the 4G system. Alternatively, the base station 120 may also be a next generation node base station (gNB) adopting a centralized and distributed architecture in the 5G system. When the base station 120 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a protocol stack of a Physical (PHY) layer. Embodiments of the disclosure may not limit the implementation manner of the base station 120.

A wireless connection may be established between the base station 120 and the terminal 110 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

Optionally, the wireless communication system may further include a network management device 130.

Several base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may be other core network devices, such as a Serving GateWay (SGW), a Public Data Network GateWay (PGW), a Policy and Charging Rules Function, or a Home Subscriber Server (HSS), etc. The implementation form of the network management device 130 is not limited in the embodiments of the disclosure.

When the terminal transmits data to the base station, it may perform data transmission based on the uplink grant-free scheduling, that is, the terminal does not need to obtain the grant permission from the base station for each uplink transmission, and directly uploads the data based on the pre-configured scheduling information.

Figure 2:
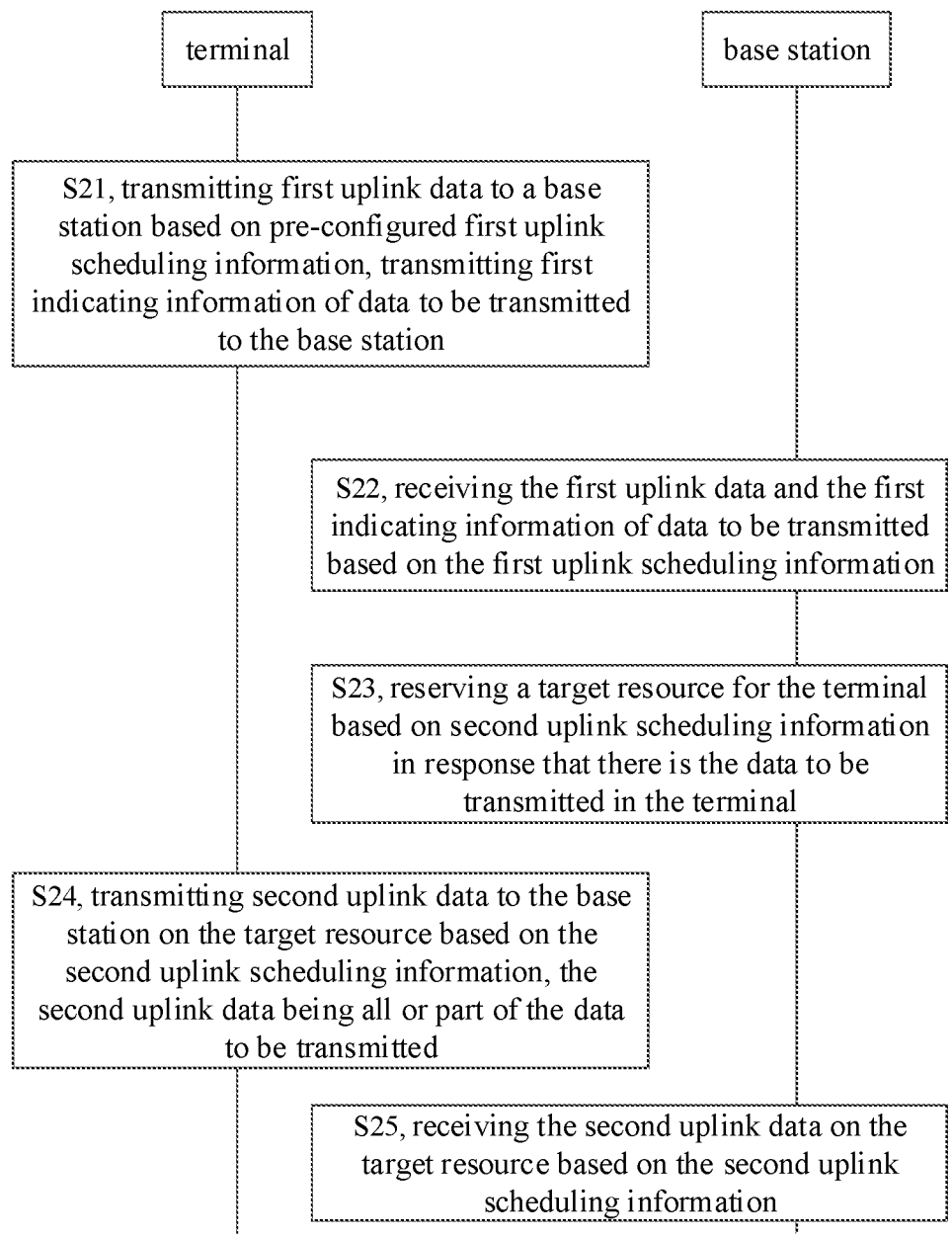
FIG. 2 is a flow chart illustrating a data transmission method based on uplink grant-free scheduling, according to an exemplary embodiment.

For example, referring to FIG. 2, FIG. 2 is a flow chart illustrating a data transmission method based on uplink grant-free scheduling, according to an exemplary embodiment. As illustrated in FIG. 2, a process of transmitting uplink data by the terminal to the base station may be as follows.

In block 21, the terminal transmits first uplink data to the base station based on pre-configured first uplink scheduling information, and transmits first indicating information of data to be transmitted to the base station.

The uplink scheduling information in the embodiments of the disclosure may include information such as uplink transmission resources and transmission modes. In addition, the transmission modes may include modulation and coding modes, multi-antenna transmission modes, and transmission powers, etc.

In the embodiments of the disclosure, the indicating information of data to be transmitted may be for indicating whether there is data to be transmitted in the terminal after transmitting the first uplink data.

In block 22, the base station receives the first uplink data and the first indicating information of data to be transmitted based on the first uplink scheduling information.

In block 23, the base station reserves a target resource for the terminal based on second uplink scheduling information in response that there is the data to be transmitted in the terminal.

In block 24, the terminal transmits second uplink data to the base station on the target resource based on the second uplink scheduling information.

The second uplink data may be all or part of the data to be transmitted.

In block 25, the base station receives the second uplink data on the target resource based on the second uplink scheduling information.

In embodiments of the disclosure, the base station may configure the physical resource supporting data blocks of one size for the terminal based on the pre-configured first uplink scheduling information. When the volume of the data to be transmitted in the terminal is greater than the size of the data block supported by the physical resource, the terminal may inform the base station that there is still data to be transmitted that needs to be transmitted, so that the base station may reserve the resource for the terminal. The terminal transmits the remaining data to be transmitted to the base station on the resource reserved by the base station through the additional second uplink scheduling information. When the base station obtains the indication that there is still data to be transmitted that needs to be transmitted in the terminal, it may continue to receive the remaining data (that is, the above-mentioned second uplink data) on the physical resource configured by the second uplink scheduling information.

That is, in the above solution, the base station may configure the resource configuration supporting one type of volume of data for the terminal through the first uplink scheduling information in advance. When the total volume of the data that needs to be transmitted in the terminal is greater than the volume of data supported by the current resource configuration, the terminal needs to inform the base station that there is still unfinished data. After that, the terminal may continue to transmit the data to the base station on the physical resource configured by another uplink scheduling information. On the one hand, when the volume of data is large, the terminal may transmit the remaining data in uplink without waiting for the arrival of the next transmission period corresponding to the first uplink scheduling information, thereby avoiding excessive data delay and improving data transmission performance. On the other hand, when the volume of data is large, the base station may reserve the additional resource for the terminal, and there is no need to specifically reserve the transmission resource corresponding to the second uplink scheduling information, so as to avoid waste of transmission resources when the volume of data is small.

Figure 3:
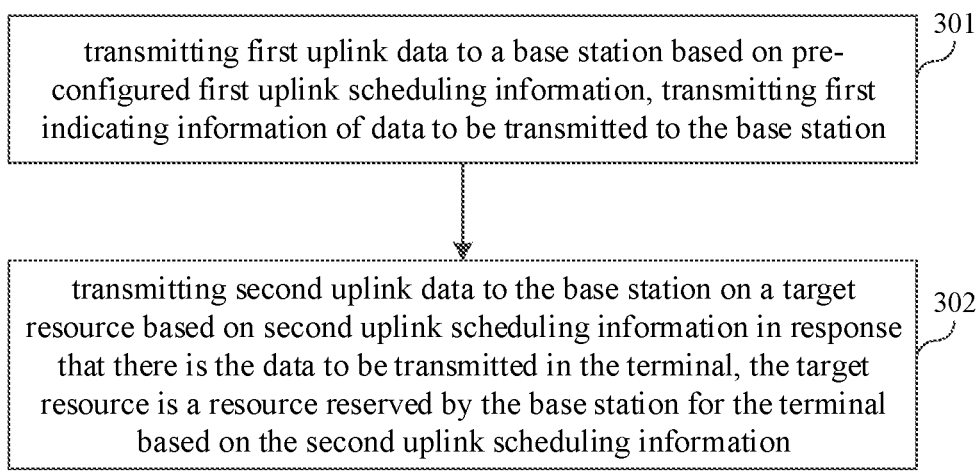
FIG. 3 is a flow chart illustrating a data transmission method based on uplink grant-free scheduling, according to an exemplary embodiment.

FIG. 3 is a flow chart illustrating a data transmission method based on uplink grant-free scheduling, according to an exemplary embodiment. As illustrated in FIG. 3, the data transmission method based on uplink grant-free scheduling may be applicable to the wireless communication system in FIG. 1, and is executed by the terminal 110 in FIG. 1. The method may include the following.

In block 301, first uplink data is transmitted to a base station based on pre-configured first uplink scheduling information, and first indicating information of data to be transmitted is transmitted to the base station. The first indicating information of data to be transmitted may be for indicating whether there is data to be transmitted in the terminal after transmitting the first uplink data.

In block 302, second uplink data is transmitted to the base station on a target resource based on second uplink scheduling information in response that there is the data to be transmitted in the terminal. The second uplink data is all or part of the data to be transmitted. The target resource is a resource reserved by the base station for the terminal based on the second uplink scheduling information.

Optionally, transmitting the first indicating information of data to be transmitted to the base station includes: carrying an indicator bit in a physical uplink shared channel PUSCH of transmitting the first uplink data, the indicator bit for indicating whether there is the data to be transmitted in the terminal after transmitting the first uplink data; or transmitting the first uplink data scrambled by a scrambling sequence to the base station, the scrambling sequence for indicating whether there is the data to be transmitted in the terminal after transmitting the first uplink data.

Optionally, in response that there is the data to be transmitted in the terminal, the method provided in embodiments further includes: transmitting information of the data to be transmitted to the base station, the information of the data to be transmitted for indicating a data volume of the data to be transmitted, and/or the information of the data to be transmitted for indicating an amount of resources required by the data to be transmitted.

Optionally, the first indicating information of data to be transmitted may be for indicating a data volume of the data to be transmitted, and/or the first indicating information of data to be transmitted may be for indicating an amount of resources required by the data to be transmitted.

Optionally, transmitting the second uplink data to the base station on the target resource based on the second uplink scheduling information in response that there is the data to be transmitted in the terminal includes: transmitting the second uplink data on the target resource based on pre-configured second uplink scheduling information in response that there is the data to be transmitted in the terminal.

Optionally, transmitting the second uplink data on the target resource based on the pre-configured second uplink scheduling information in response that there is the data to be transmitted in the terminal includes: transmitting the second uplink data based on the pre-configured second uplink scheduling information on a first time domain location after receiving hybrid automatic repeat request HARQ feedback corresponding to the first uplink data and returned by the base station, in response that there is the data to be transmitted in the terminal, a time domain offset between the first time domain location and a time domain location located by the HARQ feedback being a first designated offset.

Optionally, before transmitting the second uplink data to the base station on the target resource based on the second uplink scheduling information in response that there is the data to be transmitted in the terminal, the method further includes: receiving the second uplink scheduling information returned by the base station based on the first indicating information of data to be transmitted.

Optionally, transmitting the second uplink data to the base station on the target resource based on the second uplink scheduling information in response that there is the data to be transmitted in the terminal includes: transmitting the second uplink data based on the second uplink scheduling information on a second time domain location after receiving the second uplink scheduling information, a time domain offset between the second time domain location and a time domain location located by the second uplink scheduling information being a second designated offset.

Optionally, the method further includes: transmitting second indicating information of data to be transmitted to the base station, the second indicating information of data to be transmitted for indicating whether there is data to be transmitted in the terminal after transmitting the second uplink data.

Optionally, before transmitting the first uplink data to the base station based on the pre-configured first uplink scheduling information, the method further includes: acquiring a total data volume, the total data volume being a data volume of data to be transmitted in the terminal before transmitting the first uplink data; and determining the first uplink scheduling information from at least two pieces of pre-configured uplink scheduling information based on the total data volume; or determining a physical resource configuration for transmitting the first uplink data from at least two physical resource configurations in the first uplink scheduling information.

In conclusion, in the solution provided in the embodiments of the disclosure, the terminal may transmit the first uplink data to the base station based on the pre-configured first uplink scheduling information, and transmit the first indicating information of data to be transmitted to the base station. The first indicating information of data to be transmitted may be for indicating whether there is the data to be transmitted in the terminal after transmitting the first uplink data. When there is the data to be transmitted in the terminal, the terminal may transmit the second uplink data to the base station based on the second uplink scheduling information. That is, the base station may configure the resource configuration supporting one type of data volume for the terminal based on the first uplink scheduling information in advance. When the total volume of the data to be transmitted in the terminal is greater than the volume of the data supported by the current resource configuration, the terminal may inform the base station that there is still data to be transmitted that is not transmitted. The terminal may continue to transmit the data to the base station on the physical resource configured by another uplink scheduling information. On the one hand, when the volume of data is large, the terminal may transmit the remaining data in uplink without waiting for the arrival of the next transmission period corresponding to the first uplink scheduling information, thereby avoiding excessive data delay and improving data transmission performance. On the other hand, when the volume of data is large, the base station may reserve the additional resource for the terminal, and there is no need to specifically reserve the transmission resource corresponding to the second uplink scheduling information, so as to avoid waste of transmission resources when the volume of data is small.

Figure 4:
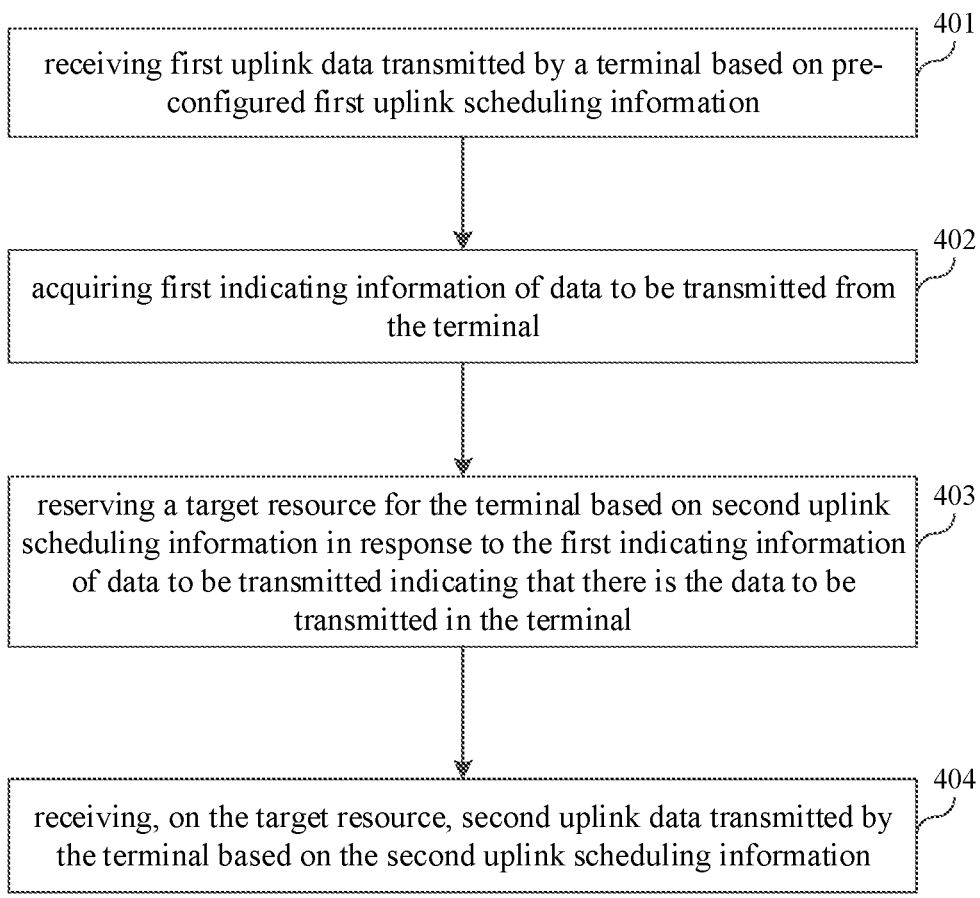
FIG. 4 is a flow chart illustrating a data transmission method based on uplink grant-free scheduling, according to an exemplary embodiment.

FIG. 4 is a flow chart illustrating a data transmission method based on uplink grant-free scheduling, according to an exemplary embodiment. As illustrated in FIG. 4, the data transmission method based on uplink grant-free scheduling may be applicable to the wireless communication system in FIG. 1, and is executed by the base station 120 in FIG. 1. The method may include the following.

In block 401, first uplink data transmitted by a terminal based on pre-configured first uplink scheduling information is received.

In block 402, first indicating information of data to be transmitted from the terminal is acquired, the first indicating information of data to be transmitted for indicating whether there is data to be transmitted in the terminal after transmitting the first uplink data.

In block 403, a target resource is reserved for the terminal based on second uplink scheduling information in response to the first indicating information of data to be transmitted indicating that there is the data to be transmitted in the terminal.

In block 404, second uplink data transmitted by the terminal based on the second uplink scheduling information is received on the target resource. The second uplink data is all or part of the data to be transmitted.

Optionally, acquiring the first indicating information of data to be transmitted from the terminal includes: acquiring an indicator bit carried in a physical uplink shared channel PUSCH of transmitting the first uplink data, the indicator bit for indicating whether there is the data to be transmitted in the terminal after transmitting the first uplink data; or acquiring a scrambling sequence for scrambling the first uplink data, the scrambling sequence for indicating whether there is the data to be transmitted in the terminal after transmitting the first uplink data.

Optionally, the method further includes: acquiring information of the data to be transmitted from the terminal in response that there is the data to be transmitted in the terminal, the information of the data to be transmitted for indicating a data volume of the data to be transmitted, and/or the information of the data to be transmitted for indicating an amount of resources required by the data to be transmitted.

Optionally, the first indicating information of data to be transmitted may be for indicating a data volume of the data to be transmitted, and/or, the first indicating information of data to be transmitted may be for indicating an amount of resources required by the data to be transmitted.

Optionally, receiving, on the target resource, the second uplink data transmitted by the terminal based on the second uplink scheduling information includes: receiving, on a first time domain location after returning hybrid automatic repeat request HARQ feedback corresponding to the first uplink data to the terminal, the second uplink data transmitted by the terminal based on pre-configured second uplink scheduling information, a time domain offset between the first time domain location and a time domain location located by the HARQ feedback being a first designated offset.

Optionally, before receiving, on the target resource, the second uplink data transmitted by the terminal based on the second uplink scheduling information, the method further includes: returning the second uplink scheduling information to the terminal based on the first indicating information of data to be transmitted.

Optionally, receiving, on the target resource, the second uplink data transmitted by the terminal based on the second uplink scheduling information includes: receiving the second uplink data transmitted by the terminal based on the second uplink scheduling information, on a second time domain location after returning the second uplink scheduling information, a time domain offset between the second time domain location and a time domain location located by the second uplink scheduling information being a second designated offset.

Optionally, the method further includes: receiving second indicating information of data to be transmitted from the terminal, the second indicating information of data to be transmitted for indicating whether there is data to be transmitted in the terminal after transmitting the second uplink data.

In conclusion, in the solution provided in the embodiments of the disclosure, the base station may receive the first uplink data transmitted by the terminal based on the pre-configured first uplink scheduling information and obtain the first indicating information of data to be transmitted from the terminal. The first indicating information of data to be transmitted may be for indicating whether there is data to be transmitted in the terminal after transmitting the first uplink data. When the first indicating information of data to be transmitted indicates that there is the data to be transmitted in the terminal, the base station reserves a target resource for the terminal based on second uplink scheduling information and receive on the reserved resource the second uplink data transmitted by the terminal based on the second uplink scheduling information. That is, the base station may configure the resource configuration supporting one type of data volume for the terminal based on the first uplink scheduling information in advance. When the total volume of the data to be transmitted in the terminal is greater than the volume of the data supported by the current resource configuration, the terminal may inform the base station that there is still data to be transmitted that is not transmitted. The terminal may continue to transmit the data to the base station on the physical resource configured by another uplink scheduling information. On the one hand, when the volume of data is large, the terminal may transmit the remaining data in uplink without waiting for the arrival of the next transmission period corresponding to the first uplink scheduling information, thereby avoiding excessive data delay and improving data transmission performance. On the other hand, when the volume of data is large, the base station may reserve the additional resource for the terminal, and there is no need to specifically reserve the transmission resource corresponding to the second uplink scheduling information, so as to avoid waste of transmission resources when the volume of data is small.

In the solution illustrated in any one of FIG. 2 to FIG. 4, the second uplink scheduling information used by the terminal when transmitting the second uplink data, may be the uplink scheduling information pre-appointed between the terminal and the base station. Or, the second uplink scheduling information used by the terminal when transmitting the second uplink data, may be the uplink scheduling information temporarily allocated by the base station when the first indicating information of data to be transmitted is acquired and the first indicating information of data to be transmitted indicates that there is the data to be transmitted in the terminal. In addition, the terminal may inform the base station whether there is still data to be transmitted in the terminal only, or if there is still data to be transmitted in the terminal, in addition to informing the base station whether there is still data to be transmitted in the terminal, it may also inform the base station that the data volume of the data to be transmitted and/or the amount of resources required by the data to be transmitted.

Figure 5:
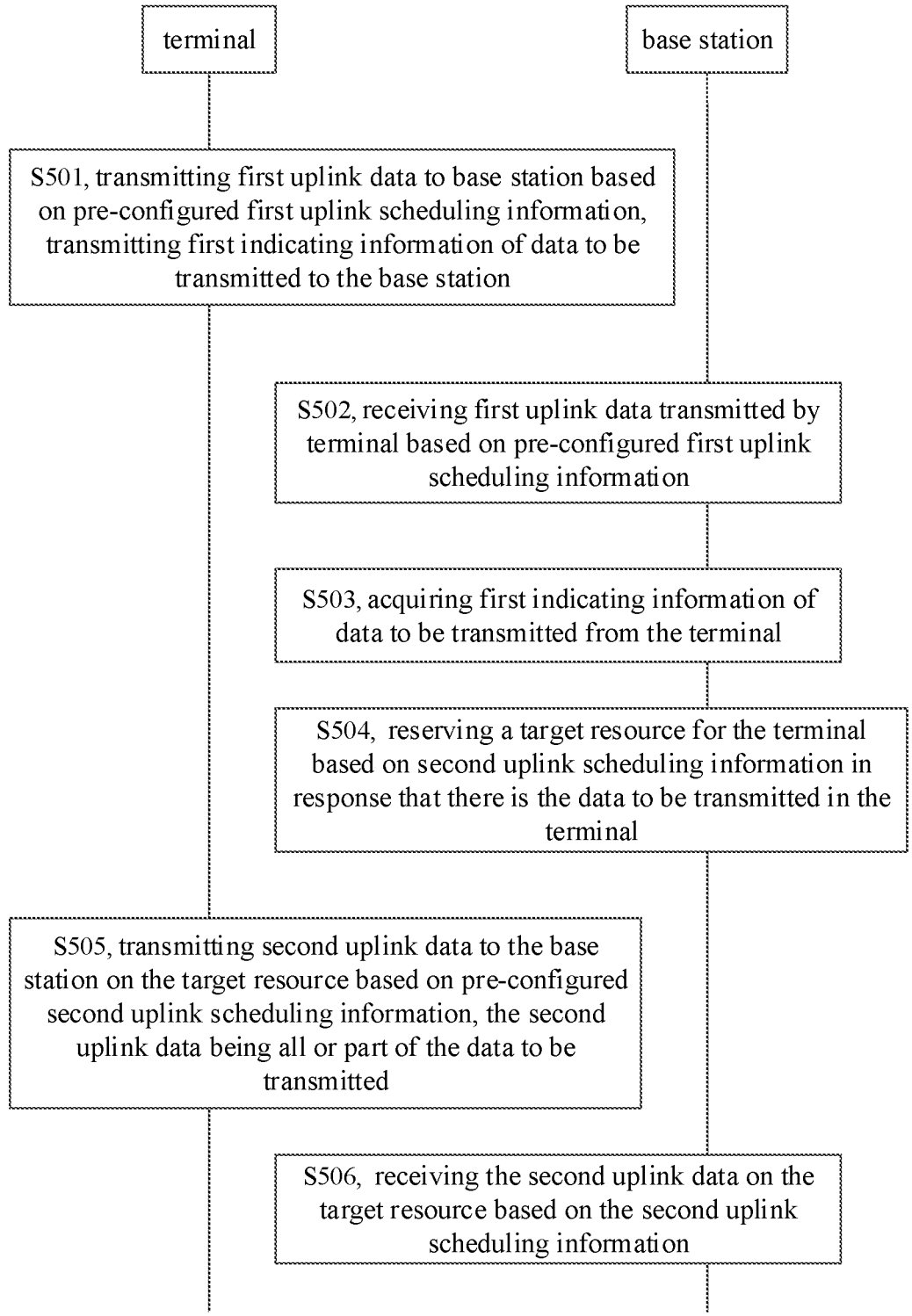
FIG. 5 is a flow chart illustrating a data transmission method based on uplink grant-free scheduling, according to an exemplary embodiment.

FIG. 5 is a flow chart illustrating a data transmission method based on uplink grant-free scheduling, according to an exemplary embodiment. As illustrated in FIG. 5, the data transmission method based on uplink grant-free scheduling may be applicable to the wireless communication system in FIG. 1. Taking the example that the second uplink scheduling information used by the terminal when transmitting the second uplink data may be the uplink scheduling information pre-appointed between the terminal and the base station, the method may include the following.

In block 501, the terminal transmits first uplink data to the base station based on pre-configured first uplink scheduling information, and transmits first indicating information of data to be transmitted to the base station.

The first indicating information of data to be transmitted may be for indicating whether there is data to be transmitted in the terminal after transmitting the first uplink data.

The above-mentioned first uplink scheduling information may be configured to indicate the physical resource, the modulation mode, the coding mode, the multi-antenna transmission mode, the transmission power, and the like for the terminal to perform the uplink transmission. The terminal may transmit the first uplink data to the base station based on the information such as the physical resource, the modulation mode, the coding mode, the multi-antenna transmission mode, and the transmission power indicated by the first uplink scheduling information. For example, the terminal may modulate and encode the first uplink data based on the modulation mode and the coding mode indicated by the first uplink scheduling information, and transmit the first uplink data modulated and encoded on the physical resource indicated by the first uplink scheduling information based on the multi-antenna transmission mode and the transmission power indicated by the first uplink scheduling information.

The first uplink scheduling information may indicate the frequency domain location and/or the time domain location of the physical resource for uplink transmission. The modulation mode may include Quadrature Phase Shift Keyin (QPSK), 16 Quadrature Amplitude Modulation (QAM), 64 QAM, etc. The coding mode may include the coding type and the specific bit rate. The multi-antenna transmission mode may include the transmission diversity and beamforming.

Optionally, transmitting the first indicating information of data to be transmitted to the base station includes: carrying an indicator bit in a physical uplink shared channel PUSCH of transmitting the first uplink data, the indicator bit for indicating whether there is the data to be transmitted in the terminal after transmitting the first uplink data; or transmitting the first uplink data scrambled by a scrambling sequence to the base station, the scrambling sequence for indicating whether there is the data to be transmitted in the terminal after transmitting the first uplink data.

In embodiments of the disclosure, the terminal may inform the base station whether there is still the data to be transmitted in the following two ways.

1. Indicating explicitly through PUSCH, such as defining an indication field in PUSCH, and indicating through an indicator bit in the indication field.

For example, the indicator bit in the indication field may be one bit: when the indicator bit in the indication field is 0, it means that there is no additional data to be transmitted in the terminal, and when the indicator bit is 1, it means that there is still additional data to be transmitted in the terminal. Or, when the indicator bit in the indication field is 0, it means that there is still additional data to be transmitted in the terminal, and when the indicator bit is 1, it means that there is no additional data to be transmitted in the terminal. The indicator bit in the indication field may also be multiple bits. For example, when the indicator bit in the indication field is 0000, it means that there is no additional data to be transmitted in the terminal, and when the indicator bit is 1111, it means that there is still additional data to be transmitted in the terminal. Or, when the indicator bit in the indication field is 1111, it means that there is still additional data to be transmitted in the terminal. When the indicator bit is 0000, it means that there is no additional data to be transmitted in the terminal. The embodiments of the disclosure do not limit the number of indicator bits in the indication field and the indication manner.

2. Indicating whether there is still additional data to be transmitted by scrambling different sequences on PUSCH. For example, when sequence 1 is used to scramble data on PUSCH, it means that there is no additional data to be transmitted in the terminal, and when sequence 2 is used to scramble data on PUSCH, it means that there is still additional data to be transmitted in the terminal. Or, when sequence 1 is used to scramble data on PUSCH, it means that there is still additional data to be transmitted in the terminal, and when sequence 2 is used to scramble data on PUSCH, it means that there is no additional data to be transmitted in the terminal.

Optionally, in embodiments of the disclosure, in addition to informing the base station whether there is still the data to be transmitted in the terminal after this uplink data transmission, the terminal may also inform the base station of a data volume of the data to be transmitted still existing in the terminal, and/or an amount of resources required by this data to be transmitted.

Optionally, in response that there is the data to be transmitted in the terminal, the terminal may transmit information of the data to be transmitted to the base station. The information of the data to be transmitted may be for indicating a data volume of the data to be transmitted, and/or the information of the data to be transmitted may be for indicating an amount of resources required by the data to be transmitted.

Optionally, in embodiments of the disclosure, in addition to informing the base station that there is still the data to be transmitted in the terminal, the terminal may also inform the base station that a range of the data volume of the data to be transmitted. For example, the corresponding relationship between ranges of the data volumes of the data to be transmitted and indication information (Index) may be defined in advance. The terminal may inform the base station of the corresponding Index based on the range of the data volume of the data to be transmitted. This Index may be indicated by a reserved indication field in PUSCH.

In a possible implementation manner, under a case that the terminal may inform the base station whether there is still the data to be transmitted in the terminal through the first indicating information of data to be transmitted, if there is still the data to be transmitted in the terminal, the terminal further informs the base station how much the data to be transmitted (that is, the information of the data to be transmitted) existing in the terminal.

When the terminal informs the base station how much the data to be transmitted existing in the terminal, it may inform of the range of the data volume of the data to be transmitted existing in the terminal, or inform the base station of a range of the amount of resources required by the data to be transmitted existing in the terminal.

For example, the terminal may separately inform the base station whether there is still the data to be transmitted and the data volume of the data to be transmitted. For example, the terminal may indicate whether there is still the data to be transmitted through an explicit indication in PUSCH or by scrambling different sequences on PUSCH. If it is indicated that there is still the data to be transmitted, the terminal may further indicate the range of the data volume of the data to be transmitted based on the correspondence in Table 1 below. If it is indicated that there is no data to be transmitted, the terminal may not further indicate the range of the data volume of the data to be transmitted.

TABLE 1

| Index (indication information) | range of data volume (byte) |
| --- | --- |
| 1 | 0~A |
| 2 | A~B |
| 3 | B~C |
| 4 | C~D |
| 5 | D~E |

Alternatively, in embodiments of the disclosure, the terminal may inform the base station of the amount of physical resources required for transmitting the data to be transmitted other than transmitting the first uplink data based on the physical resource configuration indicated by the first uplink scheduling information. For example, the corresponding relationship between amounts of physical resources and indication information (Index) is defined in advance. The terminal may inform the base station of the corresponding Index based on the range of the amount of physical resources required. This Index may be indicated by a reserved indication field in PUSCH.

Alternatively, the terminal may separately inform the base station whether there is still the data to be transmitted and the amount of resources required. For example, it may indicate whether there is still the data to be transmitted through an explicit indication in PUSCH or by scrambling different sequences on PUSCH. If it is indicated that there is still the data to be transmitted, the terminal may further indicate the range of the amount of resources required by the data to be transmitted based on Table 2. If it is indicated that there is no data to be transmitted, the terminal may not further indicate the amount of resources required.

TABLE 2

| Index | range of amount of resources required (RB) |
| --- | --- |
| 1 | 0~H |
| 2 | H~I |
| 3 | I~J |
| 4 | J~K |
| 5 | K~L |

Optionally, in response that there is the data to be transmitted in the terminal, the first indicating information of data to be transmitted may be for indicating a data volume of the data to be transmitted, and/or the first indicating information of data to be transmitted may be for indicating an amount of resources required by the data to be transmitted.

In another possible implementation manner, under a case that the terminal may inform the base station whether there is still the data to be transmitted in the terminal through the first indicating information of data to be transmitted, if there is still the data to be transmitted in the terminal, the first indicating information of data to be transmitted may further indicate how much the data to be transmitted existing in the terminal.

Correspondingly, when it informs the base station how much the data to be transmitted existing in the terminal, the first indicating information of data to be transmitted may directly indicate the range of the data volume of the data to be transmitted existing in the terminal, or the first indicating information of data to be transmitted may indicate the range of the amount of physical resources required by the data to be transmitted existing in the terminal.

For example, the corresponding relationship between ranges of data volumes and indication information may be defined in the terminal in advance. The corresponding relationship is shown in Table 3. If there is no additional data to be transmitted in the terminal, the terminal may indicate index 6. If there is still the data to be transmitted in the terminal, the terminal may select one of indicated indexes 1 to 5 based on the amount of the data to be transmitted.

TABLE 3

| Index | range of data volume (byte) |
| --- | --- |
| 1 | 0~A |
| 2 | A~B |
| 3 | B~C |
| 4 | C~D |
| 5 | D~E |
| 6 | 0 |

Alternatively, the corresponding relationship between ranges of amounts of resources required and indication information may be defined in the terminal in advance. The corresponding relationship is shown in Table 4. If there is no additional data to be transmitted in the terminal at this time, the terminal may indicate index 6. If there is still the data to be transmitted in the terminal, the terminal may select one of indexes 1 to 5 based on the amount of resources required for the data to be transmitted.

TABLE 4

| Index | range of amount of resources required (RB) |
| --- | --- |
| 1 | 0~H |
| 2 | H~I |
| 3 | I~J |
| 4 | J~K |
| 5 | K~L |
| 6 | 0 |

Optionally, in embodiments of the disclosure, the base station may pre-configure only one type of uplink scheduling information for the terminal to be used in the uplink grant-free scheduling transmission. For example, in MTC or NB-IoT, when the terminal needs to upload data after waking up, the first uplink scheduling information pre-configured by the base station for the terminal may be directly obtained.

Optionally, in embodiments of the disclosure, for the physical resource configuration for transmitting the first uplink data, the base station may configure the physical resource configurations that support multiple data volumes.

For example, in a possible implementation manner, the base station may also pre-configure at least two types of uplink scheduling information for the terminal to be used in the uplink grant-free scheduling transmission. The terminal may select one of these types of uplink scheduling information as the first uplink scheduling information when the uplink grant-free scheduling transmission may be performed. Before transmitting the first uplink data to the base station based on the pre-configured first uplink scheduling information, the terminal may also obtain a total data volume. The total data volume may be a data volume of data to be transmitted in the terminal before transmitting the first uplink data. The terminal may determine the first uplink scheduling information from at least two pieces of pre-configured uplink scheduling information based on the total data volume.

For example, in embodiments of the disclosure, the base station may pre-configure two types of uplink scheduling information for the terminal, where the data volume supported by the resource configuration indicated by the uplink scheduling information 1 is 100 bits, and the data volume supported by the resource configuration indicated by the uplink scheduling information 2 is 1000 bits. The base station may predefine the threshold for using two types of uplink scheduling information (such as 700 bit). When the total data volume to be transmitted in the terminal is greater than 700 bit, the uplink scheduling information 2 is used as the first uplink scheduling information. When the total data volume to be transmitted in the terminal is not greater than 700 bit, the uplink scheduling information 1 is used as the first uplink scheduling information.

Or, in another possible implementation manner, the base station may pre-configure only one type of first uplink scheduling information for the terminal, but at least two physical resource configurations are pre-configured in the first uplink scheduling information. The terminal may determine the physical resource configuration used in this transmission from the at least two physical resource configurations based on the total data volume.

For example, in embodiments of the disclosure, for the physical resource configuration for transmitting the first uplink data, the base station may configure the physical resource configurations supporting multiple data volumes in the first uplink scheduling information. For example, the base station may pre-configure resource configurations supporting two data volumes in the first uplink scheduling information. The data volume supported by resource configuration 1 is 100 bits, and the data volume supported by resource configuration 2 is 1000 bits. The base station may predefine the threshold for using two resource configurations. For example, when the total data volume to be transmitted is greater than 700 bits, the terminal uses resource configuration 2, and when the total data volume is not greater than 700 bits, the terminal uses resource configuration 1. When the physical resource configuration selected by the terminal may not completely transmit the data to be transmitted, the terminal may report to inform the base station that there is additional data to be transmitted.

In block 502, the base station receives the first uplink data transmitted by the terminal based on the pre-configured first uplink scheduling information.

In embodiments of the disclosure, the base station receives, through the pre-configured first uplink scheduling information, the first uplink data from the terminal For example, taking the above-mentioned first uplink scheduling information for indicating the physical resource, the modulation mode, the coding mode, the multi-antenna transmission mode, the transmission power, and the like for the terminal to perform the uplink transmission as an example, the base station may receive the data on the physical resource indicated by the first uplink scheduling information based on the multi-antenna transmission mode indicated by the first uplink scheduling information; and demodulate and decode the received data based on the modulation mode and the coding mode indicated by the first uplink scheduling information to obtain the first uplink data transmitted by the terminal.

In block 503, the base station acquires first indicating information of data to be transmitted from the terminal.

Optionally, when the terminal employs an indicator bit to indicate whether there is still data to be transmitted in the terminal after the terminal transmits the first uplink data, the base station may acquire the indicator bit carried in PUSCH of transmitting the first uplink data when acquiring the first indicating information of data to be transmitted.

Alternatively, when the terminal employs a scrambling sequence to indicate whether there is still data to be transmitted in the terminal after the terminal transmits the first uplink data, the base station may acquire the scrambling sequence for scrambling the first uplink data when acquiring the first indicating information of data to be transmitted.

Similarly, when the terminal transmits the first indicating information of data to be transmitted through the indicator bit carried in PUSCH, the base station may acquire the indicator bit carried in the predefined indication field in PUSCH that transmits the first uplink data when receiving the first uplink data. For example, when the indicator bit (bit) in the indication field is 0, the base station determines that there is no additional data to be transmitted in the terminal, and when the indicator bit is 1, the base station determines that there is additional data to be transmitted in the terminal. Or, when the indicator bit in the indication field is 0, it means that there is additional data to be transmitted in the terminal, and when the indicator bit is 1, it means that there is no additional data to be transmitted in the terminal. The indicator bit in the indication field may also be multiple bits. For example, when the indicator bit in the indication field is 0000, it means that there is no additional data to be transmitted in the terminal, and when the indicator bit is 1111, it means that there is additional data to be transmitted in the terminal. Or, when the indicator bit in the indication field is 1111, it means that there is additional data to be transmitted in the terminal. When the indicator bit is 0000, it means that there is no additional data to be transmitted in the terminal. The embodiments of the disclosure do not limit the number of indicator bits in the indication field and the indication manner.

Or, when the terminal transmits the first indicating information of data to be transmitted through scrambling PUSCH, the base station may acquire the scrambling sequence used by the terminal to scramble PUSCH. For example, when the terminal uses sequence 1 to scramble the data on PUSCH, the base station determines that there is no additional data to be transmitted in the terminal, and when the terminal uses sequence 2 to scramble the data on PUSCH, the base station determines that there is additional data to be transmitted in the terminal. Or, when the data on PUSCH is scrambled with sequence 1, it indicates that there is additional data to be transmitted in the terminal. When the data on PUSCH is scrambled with sequence 2, it means that there is no additional data to be transmitted in the terminal.

In block 504, the base station reserves a target resource for the terminal based on second uplink scheduling information in response that there is the data to be transmitted in the terminal.

The resource configuration information in the second uplink scheduling information may indicate the frequency domain location of the target resource.

Optionally, after the base station reserves the target resource for the terminal based on the second uplink scheduling information, the target resource may not be reallocated by the base station to other terminals for downlink or downlink transmission.

Similar to the first uplink scheduling information, the second uplink scheduling information may also be uplink scheduling information pre-configured by the base station for the terminal. Optionally, the base station may pre-configure the second uplink scheduling information for the terminal through broadcast signaling or user-specific signaling.

Different from the first uplink scheduling information, after the base station configures the first uplink scheduling information and the second uplink scheduling information for the terminal, it may reserve the resource indicated by the physical resource configuration in the first uplink scheduling information for the terminal, but does not immediately reserve the resource indicated by the physical resource configuration in the second uplink scheduling information for the terminal.

In block 505, the terminal transmits second uplink data to the base station on the target resource based on the pre-configured second uplink scheduling information.

The second uplink data is all or part of the data to be transmitted.

Optionally, when the base station configures the second uplink scheduling information, it may only inform the terminal of the physical resource configuration therein, and configuration information other than the physical resource configuration may reuse similar information in the first uplink scheduling information. When acquiring the second uplink scheduling information, the terminal may acquire the physical resource configuration configured by the base station in the second uplink scheduling information, and replace the physical resource configuration in the first uplink scheduling information used for transmitting the first uplink data with the physical resource configuration configured by the base station in the second uplink scheduling information, thereby obtaining the complete second uplink scheduling information.

Alternatively, the base station may also inform the terminal of the complete second uplink scheduling information. When the terminal stores uncompleted data to be transmitted, it may directly acquire the locally stored second uplink scheduling information.

In certain embodiments of the disclosure, the terminal may transmit the second uplink data based on the pre-configured second uplink scheduling information on a first time domain location after receiving hybrid automatic repeat request HARQ feedback corresponding to the first uplink data and returned by the base station. A time domain offset between the first time domain location and a time domain location located by the HARQ feedback being a first designated offset.

The above-mentioned first designated offset may be an offset pre-appointed by the base station and the terminal. For example, the first designated offset may be one or more time slots, or the first designated offset may be one or more subframes.

Optionally, the terminal transmits second indicating information of data to be transmitted to the base station. The second indicating information of data to be transmitted may be for indicating whether there is data to be transmitted in the terminal after transmitting the second uplink data.

In certain embodiments of the disclosure, when the terminal transmits the second uplink data based on the second uplink scheduling information, it may not be able to transmit all the data to be transmitted in the terminal. Therefore, the terminal may continue to transmit the indicating information of data to be transmitted to the base station to indicate whether there is still data to be transmitted in the terminal. If there is still data to be transmitted in the terminal, the terminal may continue to upload data to the base station.

In certain embodiments of the disclosure, the amount of physical resources that is same as the previous pre-configuration may be reserved for the terminal (that is, the physical resource configuration indicated by the second uplink scheduling information is the same as the physical resource configuration indicated by the first uplink scheduling information). The frequency location occupied by the reserved physical resource (that is, the physical resource indicated by the second uplink scheduling information) is the same as or is related to the frequency configuration of the previously pre-configured physical resource (the physical resource indicated by the first uplink scheduling information). For example, the frequency location of the previously pre-configured physical resource is offset by a certain amount. At the same time, other scheduling information in the first uplink scheduling information and the second uplink scheduling information, such as Modulation and Coding Scheme (MCS) and the number of repeated transmissions, may also be the same as the previous pre-configuration. In addition, the start time of the reserved physical resource is the $n^{th}$ time unit after the terminal receives the HARQ feedback of the last successful transmission (a time unit may be a time slot or a subframe). In this case, the base station does not need additional signaling to configure additional reserved resources (that is, there is no need to configure the second uplink scheduling information through special signaling each time).

In block 506, the base station receives the second uplink data transmitted by the terminal based on the second uplink scheduling information on the target resource.

Optionally, the base station receives, on a first time domain location after returning hybrid automatic repeat request HARQ feedback corresponding to the first uplink data to the terminal, the second uplink data transmitted by the terminal based on pre-configured second uplink scheduling information. A time domain offset between the first time domain location and a time domain location located by the HARQ feedback is a first designated offset.

Optionally, the base station may also obtain the second indicating information of data to be transmitted from the terminal, and continue to refer to the above process to receive the data uploaded by the terminal when the second indicating information of data to be transmitted indicates that there is data to be transmitted in the terminal after transmitting the second uplink data.

For example, when the above-mentioned second uplink data is all the data in the remaining data to be transmitted, after the second uplink data is transmitted, the terminal may transmit the second indicating information of data to be transmitted for indicating that there is no data to be transmitted in the terminal. After receiving the second indicating information of data to be transmitted, the base station no longer reserves other resources for the terminal except the physical resource indicated by the first uplink scheduling information.

When the above second uplink data is part of the remaining data to be transmitted, after the second uplink data is transmitted, the terminal may transmit the second indicating information of data to be transmitted for indicating that there is still data to be transmitted in the terminal. After receiving the second indicating information of data to be transmitted, the base station continues to reserve the resource for the terminal other than the physical resource indicated by the first uplink scheduling information, and continues to receive the data transmitted by the terminal on the other reserved resource until the data to be transmitted in the terminal is completely transmitted.

The actions in block 501 and 505 may form embodiments on the terminal side, and the actions in block 502, 503, and 504 may form embodiments on the base station side.

In conclusion, in the solution provided in the embodiments of the disclosure, the terminal may transmit the first uplink data to the base station based on the pre-configured first uplink scheduling information, and transmit the first indicating information of data to be transmitted to the base station. The first indicating information of data to be transmitted may be for indicating whether there is the data to be transmitted in the terminal after transmitting the first uplink data. When there is the data to be transmitted in the terminal, the terminal may transmit the second uplink data to the base station based on the second uplink scheduling information. That is, the base station may configure the resource configuration supporting one type of data volume for the terminal based on the first uplink scheduling information in advance. When the total volume of the data to be transmitted in the terminal is greater than the volume of the data supported by the current resource configuration, the terminal may inform the base station that there is still data to be transmitted that is not transmitted. The terminal may continue to transmit the data to the base station on the physical resource configured by another uplink scheduling information. On the one hand, when the volume of data is large, the terminal may transmit the remaining data in uplink without waiting for the arrival of the next transmission period corresponding to the first uplink scheduling information, thereby avoiding excessive data delay and improving data transmission performance. On the other hand, when the volume of data is large, the base station may reserve the additional resource for the terminal, and there is no need to specifically reserve the transmission resource corresponding to the second uplink scheduling information, so as to avoid waste of transmission resources when the volume of data is small.

In addition, in the solution in embodiments of the disclosure, the base station does not need additional signaling to configure the second uplink scheduling information, thereby achieving the effect of saving system signaling resources.

Figure 6:
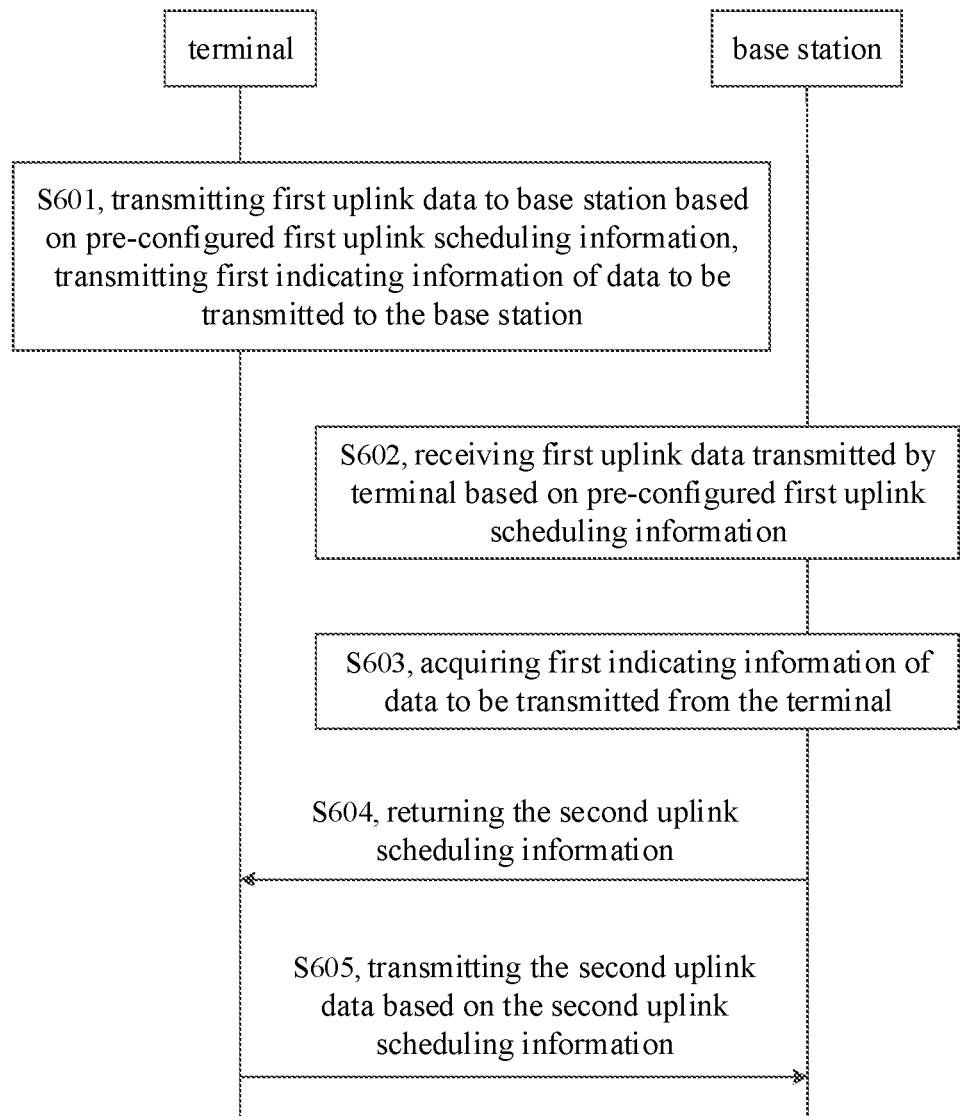
FIG. 6 is a flow chart illustrating a data transmission method based on uplink grant-free scheduling, according to an exemplary embodiment.

FIG. 6 is a flow chart illustrating a data transmission method based on uplink grant-free scheduling, according to an exemplary embodiment. As illustrated in FIG. 6, the data transmission method based on uplink grant-free scheduling may be applicable to the wireless communication system in FIG. 1. Taking the example that the second uplink scheduling information used by the terminal when transmitting the second uplink data may be the uplink scheduling information temporarily allocated by the base station, the method may include the following.

In block 601, the terminal transmits first uplink data to the base station based on pre-configured first uplink scheduling information, and transmits first indicating information of data to be transmitted to the base station.

For the manner in which the terminal transmits the first indicating information of data to be transmitted to the base station, reference may be made to the description in block 501 in FIG. 5, which may not be repeated herein.

In block 602, the base station receives the first uplink data transmitted by the terminal based on the pre-configured first uplink scheduling information.

In block 603, the base station acquires first indicating information of data to be transmitted from the terminal.

For the implementation of actions in blocks 601 to 603, reference may be made to the description in blocks 501 to 503 in corresponding embodiments of FIG. 5, which may not be repeated herein.

In block 604, in response that there is the data to be transmitted in the terminal, the base station returns the second uplink scheduling information to the terminal based on the first indicating information of data to be transmitted. Correspondingly, the terminal receives the second uplink scheduling information returned by the base station based on the first indicating information of data to be transmitted.

In certain embodiments of the disclosure, when the first indicating information of data to be transmitted indicates that there is the additional data to be transmitted in the terminal, the base station may determine the second uplink scheduling information based on the information of the data to be transmitted (that is, the data volume of the data to be transmitted, and/or, the amount of resources required for the data to be transmitted), and transmit the second uplink scheduling information to the terminal. Optionally, after determining the second uplink scheduling information, the base station may further reserve a target resource for the terminal based on the second uplink scheduling information.

For example, the base station may allocate and reserve the corresponding physical resource for the terminal based on the data volume of the data to be transmitted or the amount of required physical resources reported by the terminal, and acquire the second uplink scheduling information based on the allocated physical resource. Optionally, in addition to the resource configuration information used to indicate the allocated physical resource in the second uplink scheduling information, other information such as the modulation mode, the coding mode, the multi-antenna transmission mode, the transmission power, and the like may be newly configured by the base station, or reuse the same kind of information in the first uplink scheduling information In certain embodiments of the disclosure, the base station may inform the terminal of the amount of physical resources allocated, the frequency location of the physical resources, MCS, the number of repeated transmissions and the like through downlink notification signaling. For example, the base station transmits the second uplink scheduling information or the physical resource indicated by the second uplink scheduling information through downlink notification signaling. The start time of the allocated physical resources may be the $m^{th}$ time units after the user receives the downlink signaling.

The physical resource and the transmission mode occupied by the downlink notification signaling may be predetermined in advance. That is, the base station transmits the second uplink scheduling information or the physical resource indicated by the second uplink scheduling information through dedicated signaling.

Alternatively, the base station may also reuse existing signaling to transmit the second uplink scheduling information or the physical resource indicated by the second uplink scheduling information. For example, the base station may carry the second uplink scheduling information or the physical resource indicated by the second uplink scheduling information in the signaling used to carry the HARQ feedback of the last transmission for transmission.

In block 605, the terminal transmits second uplink data to the base station based on the second uplink scheduling information, and the base station receives the second uplink data transmitted by the terminal based on the second uplink scheduling information.

For the implementation of the action in block 605, reference may be made to the description in block 505 in corresponding embodiments of FIG. 5, which may not be repeated herein.

The actions in block 601, 604, and 605 may form embodiments on the terminal side, and the actions in block 602, 603, 604, and 605 may form embodiments on the base station side.

In conclusion, in the solution provided in the embodiments of the disclosure, the terminal may transmit the first uplink data to the base station based on the pre-configured first uplink scheduling information, and transmit the first indicating information of data to be transmitted to the base station. The first indicating information of data to be transmitted may be for indicating whether there is the data to be transmitted in the terminal after transmitting the first uplink data. When there is the data to be transmitted in the terminal, the terminal may transmit the second uplink data to the base station based on the second uplink scheduling information. That is, the base station may configure the resource configuration supporting one type of data volume for the terminal based on the first uplink scheduling information in advance. When the total volume of the data to be transmitted in the terminal is greater than the volume of the data supported by the current resource configuration, the terminal may inform the base station that there is still data to be transmitted that is not transmitted. The terminal may continue to transmit the data to the base station on the physical resource configured by another uplink scheduling information. On the one hand, when the volume of data is large, the terminal may transmit the remaining data in uplink without waiting for the arrival of the next transmission period corresponding to the first uplink scheduling information, thereby avoiding excessive data delay and improving data transmission performance. On the other hand, when the volume of data is large, the base station may reserve the additional resource for the terminal, and there is no need to specifically reserve the transmission resource corresponding to the second uplink scheduling information, so as to avoid waste of transmission resources when the volume of data is small.

The following are apparatus embodiments of the disclosure, which may be used to implement method embodiments of the disclosure. For details that are not disclosed in the apparatus embodiments of the disclosure, reference may be made to the method embodiments of the disclosure.

Figure 7:
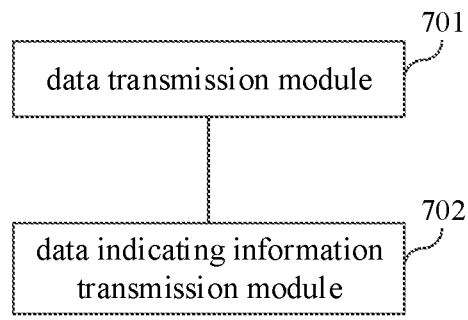
FIG. 7 is a block diagram illustrating a data transmission apparatus based on uplink grant-free scheduling, according to an exemplary embodiment.

FIG. 7 is a block diagram illustrating a data transmission apparatus based on uplink grant-free scheduling, according to an exemplary embodiment. As illustrated in FIG. 7, the data transmission apparatus based on uplink grant-free scheduling may be implemented as all or part of the terminal in the implementation environment illustrated in FIG. 1 through hardware or a combination of software and hardware, so as to execute actions executable by the terminal in any of embodiments illustrated in FIG. 2, FIG. 3, FIG. 5, or FIG. 6. The data transmission apparatus based on uplink grant-free scheduling may include a data transmission module 701 and a data indicating information transmission module 702.

The data transmission module 701 is configured to, transmit first uplink data to a base station based on pre-configured first uplink scheduling information.

The data indicating information transmission module 702 is configured to, transmit first indicating information of data to be transmitted to the base station. The first indicating information of data to be transmitted may be for indicating whether there is data to be transmitted in the terminal after transmitting the first uplink data.

The data transmission module 701 is further configured to, transmit second uplink data to the base station on a target resource based on second uplink scheduling information in response that there is the data to be transmitted in the terminal. The second uplink data is all or part of the data to be transmitted, and the target resource is a resource reserved by the base station for the terminal based on the second uplink scheduling information.

Optionally, the data indicating information transmission module 702 is configured to: carry an indicator bit in a physical uplink shared channel PUSCH of transmitting the first uplink data, the indicator bit for indicating whether there is the data to be transmitted in the terminal after transmitting the first uplink data; or transmit the first uplink data scrambled by a scrambling sequence to the base station, the scrambling sequence for indicating whether there is the data to be transmitted in the terminal after transmitting the first uplink data.

Optionally, the apparatus further includes: a data to be transmitted transmission module, configured to, in response that there is the data to be transmitted in the terminal, transmit information of the data to be transmitted to the base station. The information of the data to be transmitted may be for indicating a data volume of the data to be transmitted, and/or the information of the data to be transmitted for indicating an amount of resources required by the data to be transmitted.

Optionally, the first indicating information of data to be transmitted may be for indicating a data volume of the data to be transmitted, and/or, the first indicating information of data to be transmitted may be for indicating an amount of resources required by the data to be transmitted.

Optionally, the data transmission module 702 is configured to transmit the second uplink data on the target resource based on pre-configured second uplink scheduling information in response that there is the data to be transmitted in the terminal.

Optionally, the data transmission module 702 is configured to transmit the second uplink data based on the pre-configured second uplink scheduling information on a first time domain location after receiving hybrid automatic repeat request HARQ feedback corresponding to the first uplink data and returned by the base station, in response that there is the data to be transmitted in the terminal. A time domain offset between the first time domain location and a time domain location located by the HARQ feedback is a first designated offset.

Optionally, the apparatus further includes: a scheduling information reception module, configured to, receive the second uplink scheduling information returned by the base station based on the first indicating information of data to be transmitted before transmitting, by the data transmission module, the second uplink data to the base station on the target resource based on the second uplink scheduling information.

Optionally, the data transmission module 702 is configured to transmit the second uplink data based on the second uplink scheduling information on a second time domain location after receiving the second uplink scheduling information. A time domain offset between the second time domain location and a time domain location located by the second uplink scheduling information is a second designated offset.

Optionally, the data indicating information transmission module 701 is configured to transmit second indicating information of data to be transmitted to the base station, the second indicating information of data to be transmitted for indicating whether there is data to be transmitted in the terminal after transmitting the second uplink data.

Optionally, the apparatus further includes: a total data volume acquiring module, configured to acquire a total data volume before transmitting, by the data transmission module, the first uplink data to the base station based on the pre-configured first uplink scheduling information, the total data volume being a data volume of data to be transmitted in the terminal before transmitting the first uplink data; and a determining module, configured to determine the first uplink scheduling information from at least two pieces of pre-configured uplink scheduling information based on the total data volume; or determining a physical resource configuration for transmitting the first uplink data from at least two physical resource configurations in the first uplink scheduling information.

Figure 8:
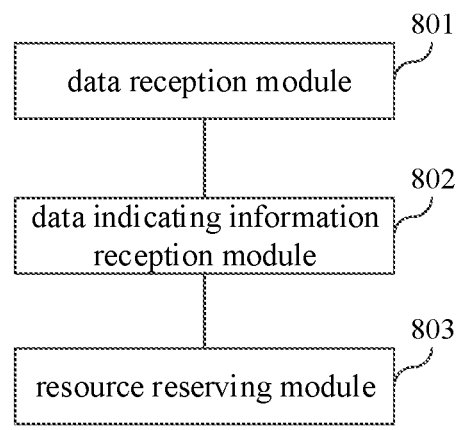
FIG. 8 is a block diagram illustrating a data transmission apparatus based on uplink grant-free scheduling, according to an exemplary embodiment.

FIG. 8 is a block diagram illustrating a data transmission apparatus based on uplink grant-free scheduling, according to an exemplary embodiment. As illustrated in FIG. 8, the data transmission apparatus based on uplink grant-free scheduling may be implemented as all or part of the base station in the implementation environment illustrated in FIG. 1 through hardware or a combination of software and hardware, so as to execute actions executable by the base station in any of embodiments illustrated in FIG. 2, FIG. 4, FIG. 5, or FIG. 6. The data transmission apparatus based on uplink grant-free scheduling may include a data reception module 801, a data indicating information reception module 802, and a resource reserving module 803.

The data reception module 801 is configured to, receive first uplink data transmitted by a terminal based on pre-configured first uplink scheduling information.

The data indicating information reception module 802 is configured to, acquire first indicating information of data to be transmitted from the terminal, the first indicating information of data to be transmitted for indicating whether there is data to be transmitted in the terminal after transmitting the first uplink data.

The data reception module 801 is configured to receive second uplink data transmitted by the terminal based on the second uplink scheduling information in response to the first indicating information of data to be transmitted indicating that there is data to be transmitted in the terminal. The second uplink data is all or part of the data to be transmitted.

Optionally, the data indicating information reception module 802 is configured to: acquire an indicator bit carried in a physical uplink shared channel PUSCH of transmitting the first uplink data, the indicator bit for indicating whether there is the data to be transmitted in the terminal after transmitting the first uplink data; or acquire a scrambling sequence for scrambling the first uplink data, the scrambling sequence for indicating whether there is the data to be transmitted in the terminal after transmitting the first uplink data.

Optionally, the apparatus further includes: a data to be transmitted reception module, configured to, acquire information of the data to be transmitted from the terminal in response that there is the data to be transmitted in the terminal, the information of the data to be transmitted for indicating a data volume of the data to be transmitted, and/or the information of the data to be transmitted for indicating an amount of resources required by the data to be transmitted.

Optionally, the first indicating information of data to be transmitted may be for indicating a data volume of the data to be transmitted, and/or, the first indicating information of data to be transmitted may be for indicating an amount of resources required by the data to be transmitted.

Optionally, the data reception module 801 is configured to, receive, on a first time domain location after returning hybrid automatic repeat request HARQ feedback corresponding to the first uplink data to the terminal, the second uplink data transmitted by the terminal based on pre-configured second uplink scheduling information, a time domain offset between the first time domain location and a time domain location located by the HARQ feedback being a first designated offset.

Optionally, the apparatus further includes: a scheduling information transmission module, configured to, return the second uplink scheduling information to the terminal based on the first indicating information of data to be transmitted before receiving by the data reception module 801, on the target resource, the second uplink data transmitted by the terminal based on the second uplink scheduling information.

Optionally, the data reception module 801 is configured to, receive the second uplink data transmitted by the terminal based on the second uplink scheduling information, on a second time domain location after returning the second uplink scheduling information, a time domain offset between the second time domain location and a time domain location located by the second uplink scheduling information being a second designated offset.

Optionally, the data indicating information reception module 802 is configured to receive second indicating information of data to be transmitted from the terminal, the second indicating information of data to be transmitted for indicating whether there is data to be transmitted in the terminal after transmitting the second uplink data.

Exemplary embodiments of the disclosure may further provide a data transmission system based on uplink grant-free scheduling. The system may include a terminal and a base station.

The terminal includes the data transmission apparatus based on uplink grant-free scheduling provided in embodiments illustrated in FIG. 7.

The base station includes the data transmission apparatus based on uplink grant-free scheduling provided in embodiments illustrated in FIG. 8.

It should be noted that the apparatuses provided by the above embodiments may be illustrated exemplarily by the division of each of the respective function modules. In actual applications, the above functions may be allocated by different functional modules based on actual needs, so that the content structure of the apparatus may be divided into different functional modules to complete all or part of the above described.

With respect to the apparatuses in the above embodiments, the specific manners for performing operations for individual modules therein have been described in detail in the embodiments regarding the methods, which will not be elaborated herein.

Exemplary embodiments of the disclosure may further provide a data transmission device based on uplink grant-free scheduling, which may implement actions executable by the terminal in any of embodiments illustrated in FIG. 2, FIG. 3, FIG. 5, or FIG. 6. The data transmission device based on uplink grant-free scheduling may include a processor; and a memory for storing instructions executable by the processor.

The processor is configured to: receive first uplink data transmitted by a terminal based on pre-configured first uplink scheduling information; transmit first uplink data to a base station based on pre-configured first uplink scheduling information; transmit first indicating information of data to be transmitted to the base station, the first indicating information of data to be transmitted for indicating whether there is data to be transmitted in the terminal after transmitting the first uplink data; and transmit second uplink data to the base station on a target resource based on second uplink scheduling information in response that there is the data to be transmitted in the terminal, the second uplink data being all or part of the data to be transmitted.

Exemplary embodiments of the disclosure may further provide a data transmission device based on uplink grant-free scheduling, which may implement actions executable by the base station in any of embodiments illustrated in FIG. 2, FIG. 4, FIG. 5, or FIG. 6. The data transmission device based on uplink grant-free scheduling may include a processor; and a memory for storing instructions executable by the processor.

The processor is configured to: receive first uplink data transmitted by a terminal based on pre-configured first uplink scheduling information; acquire first indicating information of data to be transmitted from the terminal, the first indicating information of data to be transmitted for indicating whether there is data to be transmitted in the terminal after transmitting the first uplink data; and receive second uplink data transmitted by the terminal based on the second uplink scheduling information in response to the first indicating information of data to be transmitted indicating that there is the data to be transmitted in the terminal.

The above may employ the terminal and the base station as an example to describe the solutions provided in embodiments of the disclosure. It should be appreciated that the terminal and the base station include the hardware structure and/or the software module that performs each function. The disclosure may be implemented in hardware or in a combination of hardware and computer software in connection with modules and actions of the examples described in the embodiments of the disclosure. It depends on specific applications and design constraints of the technical solutions to employ the hardware or the combination of hardware and computer software to implement a certain function. Those skilled in the art may use different methods to implement the described functions for each particular application, but this implementation should not be considered to exceed the scope of the technical solutions of the disclosure.

Figure 9:
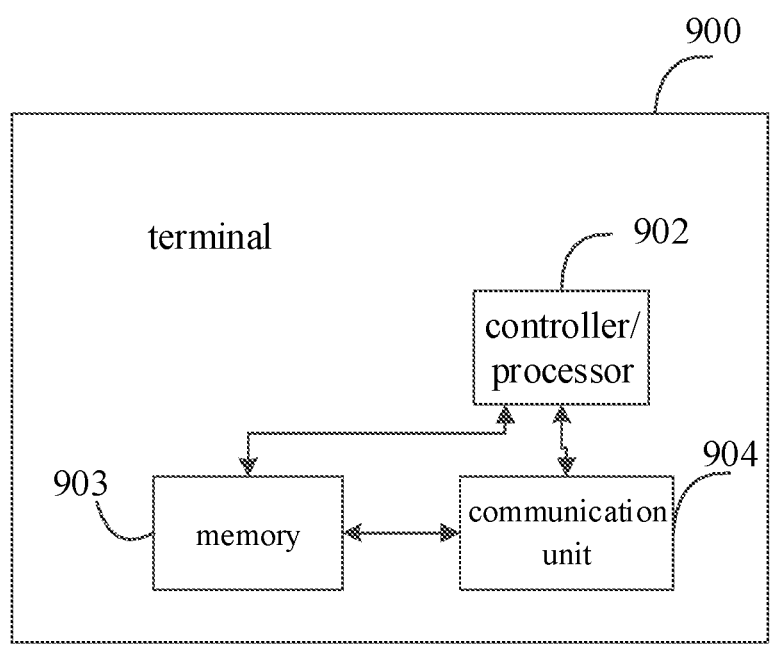
FIG. 9 is a block diagram illustrating a data transmission device based on uplink grant-free scheduling, according to an exemplary embodiment.

FIG. 9 is a block diagram illustrating a data transmission device based on uplink grant-free scheduling, according to an exemplary embodiment. The device 900 may be implemented as the terminal or the base station in various embodiments described above.

The device 900 may include a communication unit 904 and a processor 902. The processor 902 may also be a controller, and FIG. 9 is shown as "controller/processor 902". The communication unit 904 is configured to support terminals to communicate with other network devices (e.g., base stations, etc.).

Further, the device 900 may include a memory 903. The memory 903 is configured to store program codes and data of the terminal 900.

It should be appreciated that FIG. 9 shows only the simplified design of the device 900. In practical applications, the device 900 may include any number of processors, controllers, memory, communication units, and the like, and all terminals or base stations that may implement the are within the scope of the disclosure.

Those skilled in the art should appreciate that in the above or more examples, the functions described in the disclosure may be implemented with hardware, software, firmware, or any combination thereof. When implementing using software, these functions may be stored in a computer readable medium, or transmitted as one or more instructions or codes on a computer readable medium. The computer readable medium includes a computer storage medium and a communication medium. The communication medium includes any medium that facilitates transmitting a computer program from one place to another. The storage medium may be any available medium that may be accessed by a general or dedicated computer.

The disclosure also provides a computer storage medium for storing computer software instructions used in the above-described terminal or base station, which may include programs for performing the above-described data transmission method based on uplink grant-free scheduling.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the claimed invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the claimed invention only be limited by the appended claims.

What is claimed is:

1. A data transmission method based on uplink grant-free scheduling, comprising:
    acquiring, by the terminal, a total data volume, the total data volume being a data volume of data to be transmitted in the terminal before transmitting first uplink data; and
    determining, by the terminal, pre-configured first uplink scheduling information from at least two pieces of pre-configured uplink scheduling information based on the total data volume; or determining a physical resource configuration for transmitting the first uplink data from at least two physical resource configurations in the first uplink scheduling information;
    transmitting, by the terminal, the first uplink data to a base station based on the first uplink scheduling information; transmitting, by the terminal, first indicating information of data to be transmitted to the base station, the indicating information of data to be transmitted for indicating whether there is data to be transmitted in the terminal after transmitting the first uplink data;
    receiving, by the base station, the first uplink data and the first indicating information of data to be transmitted based on the first uplink scheduling information;
    reserving, by the base station, a target resource for the terminal based on second uplink scheduling information in response that there is the data to be transmitted in the terminal;
    transmitting, by the terminal, second uplink data to the base station on the target resource based on the second uplink scheduling information, the second uplink data being all or part of the data to be transmitted; and receiving, by the base station, the second uplink data on the target resource based on the second uplink scheduling information.

2. A data transmission method based on uplink grant-free scheduling, implementable by a terminal, and comprising:
acquiring a total data volume, the total data volume being a data volume of data to be transmitted in the terminal before transmitting first uplink data; and
determining pre-configured first uplink scheduling information from at least two pieces of pre-configured uplink scheduling information based on the total data volume; or determining a physical resource configuration for transmitting the first uplink data from at least two physical resource configurations in the first uplink scheduling information;
transmitting the first uplink data to a base station based on the first uplink scheduling information;
transmitting first indicating information of data to be transmitted to the base station, the first indicating information of data to be transmitted for indicating whether there is data to be transmitted in the terminal after transmitting the first uplink data; and
transmitting second uplink data to the base station on a target resource based on second uplink scheduling information in response that there is the data to be transmitted in the terminal, the second uplink data being all or part of the data to be transmitted, and the target resource is a resource reserved by the base station for the terminal based on the second uplink scheduling information.

3. The method as claimed in claim 2, wherein transmitting the first indicating information of data to be transmitted to the base station comprises:
carrying an indicator bit in a physical uplink shared channel PUSCH of transmitting the first uplink data, the indicator bit for indicating whether there is the data to be transmitted in the terminal after transmitting the first uplink data;
or,
transmitting the first uplink data scrambled by a scrambling sequence to the base station, the scrambling sequence for indicating whether there is the data to be transmitted in the terminal after transmitting the first uplink data.

4. The method as claimed in claim 3, in response that there is the data to be transmitted in the terminal, further comprising:
transmitting information of the data to be transmitted to the base station, the information of the data to be transmitted for indicating a data volume of the data to be transmitted, and/or the information of the data to be transmitted for indicating an amount of resources required by the data to be transmitted.

5. The method as claimed in claim 2, wherein
the first indicating information of data to be transmitted is for indicating a data volume of the data to be transmitted,
and/or,
the first indicating information of data to be transmitted is for indicating an amount of resources required by the data to be transmitted.

6. The method as claimed in claim 2, wherein transmitting the second uplink data to the base station on the target resource based on the second uplink scheduling information in response that there is the data to be transmitted in the terminal comprises:

transmitting the second uplink data on the target resource based on pre-configured second uplink scheduling information in response that there is the data to be transmitted in the terminal.

7. The method as claimed in claim 6, wherein transmitting the second uplink data on the target resource based on the pre-configured second uplink scheduling information in response that there is the data to be transmitted in the terminal comprises:
transmitting the second uplink data based on the pre-configured second uplink scheduling information on a first time domain location after receiving hybrid automatic repeat request HARQ feedback corresponding to the first uplink data and returned by the base station, in response that there is the data to be transmitted in the terminal, a time domain offset between the first time domain location and a time domain location located by the HARQ feedback being a first designated offset.

8. The method as claimed in claim 2, before transmitting the second uplink data to the base station on the target resource based on the second uplink scheduling information in response that there is the data to be transmitted in the terminal, further comprising:
receiving the second uplink scheduling information returned by the base station based on the first indicating information of data to be transmitted.

9. The method as claimed in claim 8, wherein transmitting the second uplink data to the base station on the target resource based on the second uplink scheduling information in response that there is the data to be transmitted in the terminal comprises:
transmitting the second uplink data based on the second uplink scheduling information on a second time domain location after receiving the second uplink scheduling information, a time domain offset between the second time domain location and a time domain location located by the second uplink scheduling information being a second designated offset.

10. The method as claimed in claim 2, further comprising:
transmitting second indicating information of data to be transmitted to the base station, the second indicating information of data to be transmitted for indicating whether there is data to be transmitted in the terminal after transmitting the second uplink data.

11. A data transmission device based on uplink grant-free scheduling, applicable in a terminal, and comprising:
a processor; and
a memory for storing instructions executable by the processor;
wherein the processor is configured to: perform the method of claim 2.

12. A data transmission method based on uplink grant-free scheduling, implementable by a base station, and comprising:
receiving first uplink data transmitted by a terminal based on pre-configured first uplink scheduling information, wherein the first uplink scheduling information is obtained by: acquiring, by the terminal, a total data volume, the total data volume being a data volume of data to be transmitted in the terminal before transmitting the first uplink data; and determining, by the terminal, the first uplink scheduling information from at least two pieces of pre-configured uplink scheduling information based on the total data volume, wherein each piece of pre-configured uplink scheduling information has a corresponding threshold; or determining a physical resource configuration for transmitting the first uplink data from at least two physical resource configurations in the first uplink scheduling information, wherein each physical resource configuration has a corresponding threshold;

acquiring first indicating information of data to be transmitted from the terminal, the first indicating information of data to be transmitted for indicating whether there is data to be transmitted in the terminal after transmitting the first uplink data;

reserving a target resource for the terminal based on second uplink scheduling information in response to the first indicating information of data to be transmitted indicating that there is the data to be transmitted in the terminal; and receiving, on the target resource, second uplink data transmitted by the terminal based on the second uplink scheduling information, the second uplink data being all or part of the data to be transmitted.

13. The method as claimed in claim 12, wherein acquiring the first indicating information of data to be transmitted from the terminal comprises:

acquiring an indicator bit carried in a physical uplink shared channel PUSCH of transmitting the first uplink data, the indicator bit for indicating whether there is the data to be transmitted in the terminal after transmitting the first uplink data;

or, acquiring a scrambling sequence for scrambling the first uplink data, the scrambling sequence for indicating whether there is the data to be transmitted in the terminal after transmitting the first uplink data.

14. The method as claimed in claim 13, further comprising:

acquiring information of the data to be transmitted from the terminal in response that there is the data to be transmitted in the terminal, the information of the data to be transmitted for indicating a data volume of the data to be transmitted, and/or the information of the data to be transmitted for indicating an amount of resources required by the data to be transmitted.

15. The method as claimed in claim 12, wherein the first indicating information of data to be transmitted is for indicating a data volume of the data to be transmitted, and/or, the first indicating information of data to be transmitted is for indicating an amount of resources required by the data to be transmitted.

16. The method as claimed in claim 12, wherein receiving, on the target resource, the second uplink data transmitted by the terminal based on the second uplink scheduling information comprises:

receiving, on a first time domain location after returning hybrid automatic repeat request HARQ feedback corresponding to the first uplink data to the terminal, the second uplink data transmitted by the terminal based on pre-configured second uplink scheduling information, a time domain offset between the first time domain location and a time domain location located by the HARQ feedback being a first designated offset.

17. The method as claimed in claim 12, before receiving, on the target resource, the second uplink data transmitted by the terminal based on the second uplink scheduling information, further comprising:

returning the second uplink scheduling information to the terminal based on the first indicating information of data to be transmitted.

18. The method as claimed in claim 17, wherein receiving, on the target resource, the second uplink data transmitted by the terminal based on the second uplink scheduling information comprises:

receiving the second uplink data transmitted by the terminal based on the second uplink scheduling information, on a second time domain location after returning the second uplink scheduling information, a time domain offset between the second time domain location and a time domain location located by the second uplink scheduling information being a second designated offset.

19. The method as claimed in claim 12, further comprising:

receiving second indicating information of data to be transmitted from the terminal, the second indicating information of data to be transmitted for indicating whether there is data to be transmitted in the terminal after transmitting the second uplink data.

* * * * *